United States Patent [19]
Unternahrer et al.

[11] Patent Number: 5,828,690
[45] Date of Patent: Oct. 27, 1998

[54] UNITARY BODY LASER HEAD

[75] Inventors: Josef Robert Unternahrer, Niskayuna; John Leo August, Jr., Schenectady, both of N.Y.

[73] Assignee: General Electric Company, Schenectady, N.Y.

[21] Appl. No.: 574,015

[22] Filed: Dec. 18, 1995

[51] Int. Cl.$^6$ ..................................................... H01S 3/04
[52] U.S. Cl. ............................. 372/107; 372/72; 372/99
[58] Field of Search .................................. 372/70, 72, 99, 372/107

[56] References Cited

U.S. PATENT DOCUMENTS

| | | | |
|---|---|---|---|
| 3,478,608 | 11/1969 | Met | 372/107 X |
| 4,232,276 | 11/1980 | Iwata | 372/72 |
| 4,751,716 | 6/1988 | Ream et al. | 372/72 |
| 4,800,569 | 1/1989 | Azad | 372/99 |
| 4,858,243 | 8/1989 | Bar-Joseph | 372/72 |
| 4,910,746 | 3/1990 | Nicholson | 372/107 X |
| 5,020,895 | 6/1991 | Giesen et al. | 372/107 X |
| 5,287,371 | 2/1994 | Bournes | 372/72 X |
| 5,418,809 | 5/1995 | August, Jr. et al. | 372/71 |
| 5,548,604 | 8/1996 | Toepel | 372/72 X |

FOREIGN PATENT DOCUMENTS

| | | | |
|---|---|---|---|
| 2-2190 | 1/1990 | Japan | 372/72 |
| 5-160477 | 6/1993 | Japan | 372/107 |

OTHER PUBLICATIONS

Woodruff et al, "Picosecond Transverse–Flow Flashlamp–Pumped Dye Laser", Applied Optics, vol. 19, No. 1, pp. 118–123, 01 Jan. 1980.

*Primary Examiner*—John D. Lee
*Attorney, Agent, or Firm*—Tyler Maddry; Marvin Snyder

[57] ABSTRACT

A laser head includes a body having opposite ends, and a bore extending axially therethrough for defining a reflector. The body is a unitary member circumferentially around the reflector. The reflector includes a center cavity for coaxially receiving a laser rod, and a plurality of lateral cavities disposed parallel to and extending radially outwardly from the center cavity for receiving flashlamps for optically pumping the laser rod. Reflector and lamp endcaps are removably mounted to the body for mounting the lamps and rod, and allowing individual replacement thereof.

22 Claims, 4 Drawing Sheets

FIG.6          FIG.7

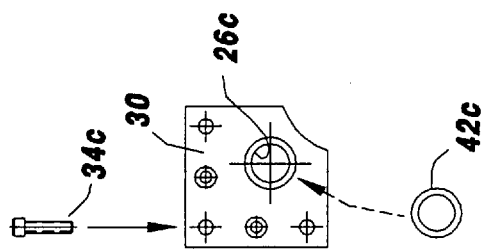
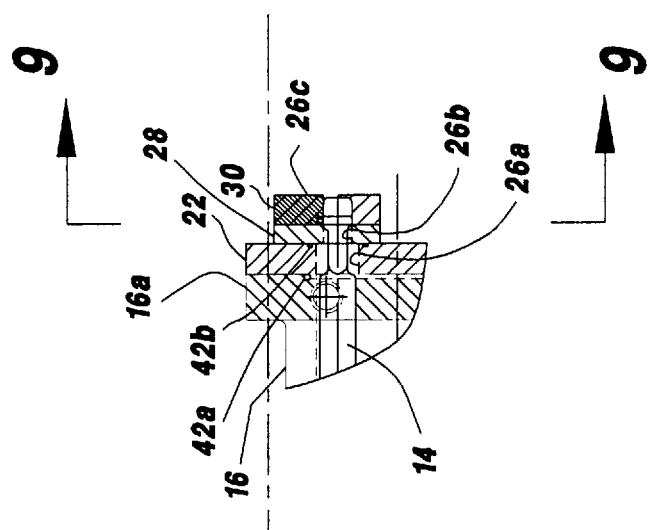
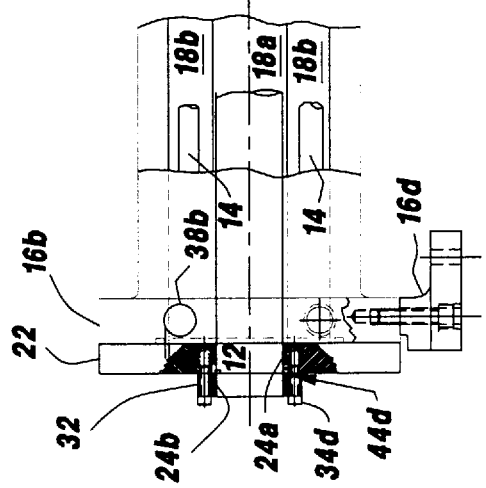

UNITARY BODY LASER HEAD

BACKGROUND OF THE INVENTION

The present invention relates generally to lasers, and, more specifically, to a head for supporting a laser rod and flashlamps.

In one type of laser, a solid-state laser gain medium such as neodymium (Nd) glass in rod form is optically pumped by a plurality of parallel, linear flashlamps. The flashlamps must be accurately aligned with the laser rod and fixedly supported for ensuring effective pumping efficiency. And, the lamps and rod must be suitably cooled, by circulating water for example, for removing heat during operation of the laser.

The lamps and rod are typically mounted in an enclosed frame collectively defining a laser head. A typical laser head is an assembly of many components required to accurately mount, cool, seal, and optically pump the laser rod by the flashlamps. When the lamps require replacement, the head must be suitably disassembled for providing access thereto and removal and replacement as required. It is therefore desirable to have a relatively simple laser head for accurately mounting the lamps and rod for reducing parts count and improving periodic maintenance thereof requiring replacement of the lamps or rod.

SUMMARY OF THE INVENTION

A laser head includes a body having opposite ends, and a bore extending axially therethrough for defining a reflector. The body is a unitary member circumferentially around the reflector. The reflector includes a center cavity for coaxially receiving a laser rod, and a plurality of lateral cavities disposed parallel to and extending radially outwardly from the center cavity for receiving flashlamps for optically pumping the laser rod. Reflector and lamp endcaps are removably mounted to the body for mounting the lamps and rod, and allowing individual replacement thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 6 is an elevational, sectional view through the reflector endcap illustrated in FIG. 1 and taken along line 6—6.

FIG. 7 is an elevational, sectional view through a lamp port in the reflector inner endcap illustrated in FIG. 5 and taken along line 7—7.

FIG. 8 is a partly sectional elevational view of a portion of the laser head shown in FIG. 1 illustrating a reflector endcap joined to the body, a lamp inner endcap joined to the reflector endcap, and a lamp outer endcap joined to the inner endcap for allowing removal of individual lamps.

FIG. 9 is an elevational, exploded end view of the lamp outer endcap illustrated in FIG. 8 and taken along line 9—9.

FIG. 10 is an elevational, partly sectional view of the rod retainer illustrated in FIG. 5 mounted to the reflector endcap for supporting the rod thereto.

DESCRIPTION OF THE PREFERRED EMBODIMENT(S)

Figure 1:
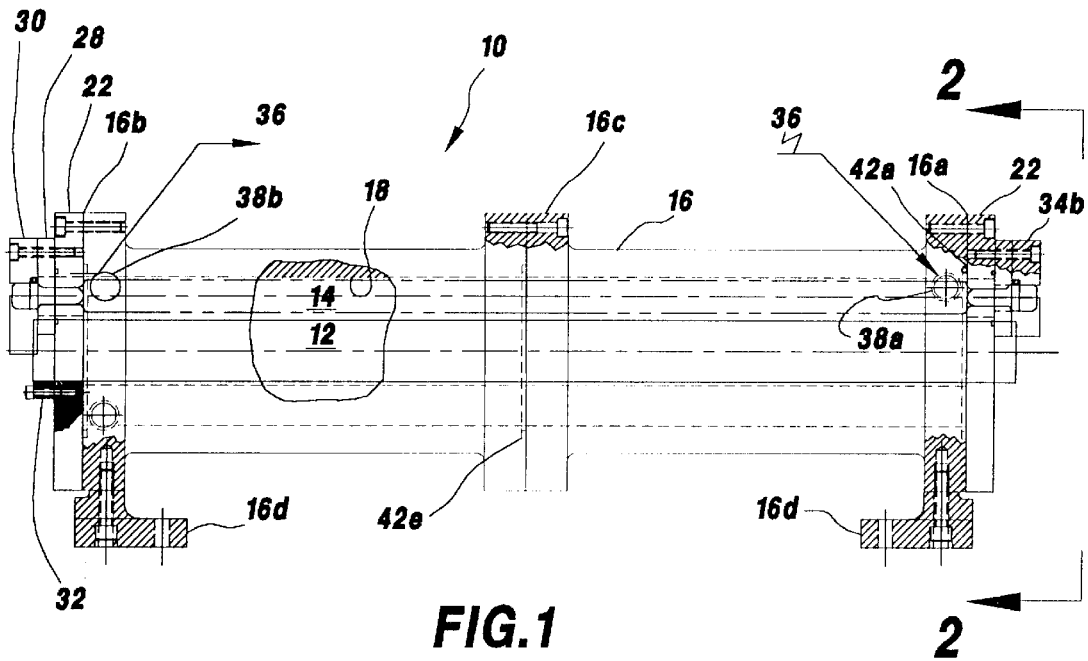
FIG. 1 is a side elevational, partly sectional view of a laser head in accordance with an exemplary embodiment of the present invention.
Figure 2:
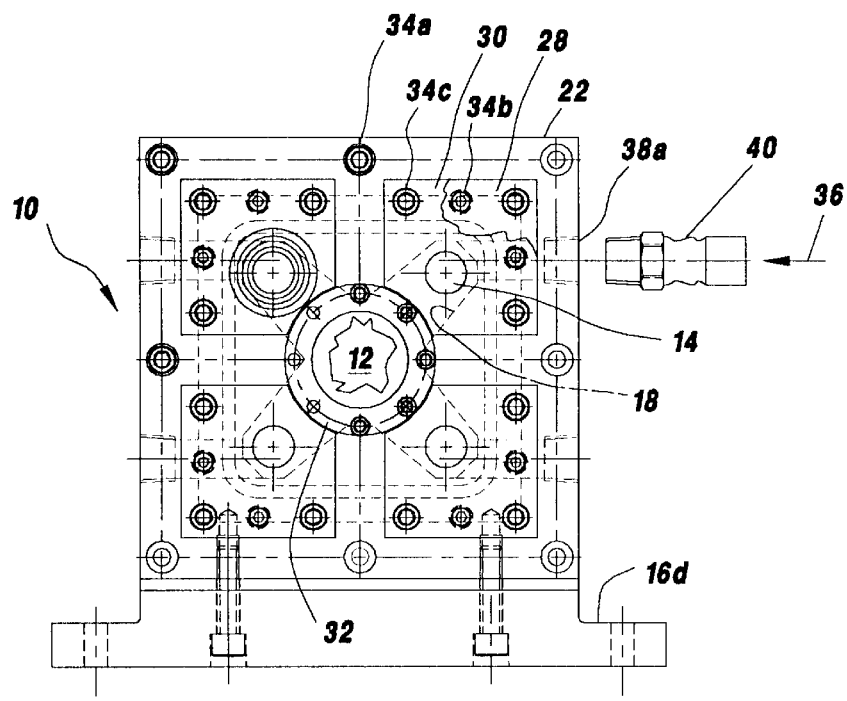
FIG. 2 is an end elevational view of one end of the head illustrated in FIG. 1 and taken along line 2—2.

Illustrated in FIGS. 1 and 2 is a laser head 10 in accordance with an exemplary embodiment of the present invention for accurately mounting a relatively large laser rod 12 adjacent to a plurality of linear flashlamps 14. The rod 12 may take any conventional form such as a solid-state laser gain medium, Neodymium Nd:glass, which is about 43 cm long for example. The lamps 14 are also conventional and are about 40 cm long, and effective for optically pumping the rod 12 for use in generating a laser beam therefrom in a conventional manner.

The head 10 is an assembly of components including a body 16 having first and second opposite axial ends 16a,b integral therewith which are generally flat and parallel to each other. The body 16 also includes a central bore extending axially between the body ends 16a,b which defines a reflector 18 extending completely axially or longitudinally through the body 16.

In accordance with one feature of the present invention, the body 16 is a unitary or one-piece member circumferentially around the reflector 18. The body 16 is initially a completely solid block of metal through which is formed the reflector 18 by using conventional wire electrical discharge machining (EDM) which allows the reflector 18 to have a relatively complex configuration for use in the laser head 10. In the exemplary embodiment illustrated in FIG. 1, although the body 16 is unitary around its circumference, it may be nevertheless formed in two axial parts in the event that the available length of EDM wire is not sufficient for producing a suitably long reflector 18 in the body 16. The accuracy of machining using wire EDM is limited by the length of the EDM wire itself, and for a relatively short body 16, the body 16 may be unitary both circumferentially around the reflector 18 and axially along its length.

FIG. 1 illustrates that a relatively long body 16 may be bifurcated into two or more axial components with a suitable central flanged joint 16c being provided for structurally and sealingly joining the two body components together. The joint 16c in the exemplary embodiment illustrated in FIG. 1 includes a pair of flanges suitably bolted together and suitably sealed, using an internal O-ring for example, for allowing the reflector 18 to run coextensively between the two components of the body 16. The body 16 may also include integral or discrete mounting feet 16d if desired.

Figure 3:
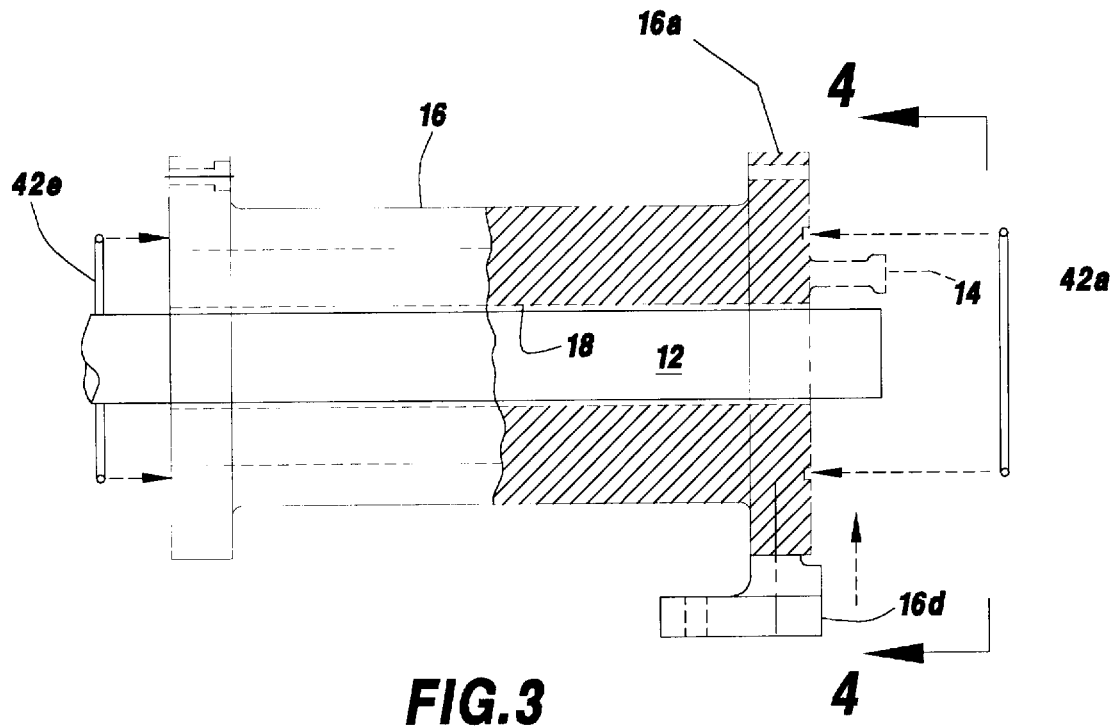
FIG. 3 is an elevational, partly sectional exploded view of one end of a body of the head illustrated in FIG. 1 having endcaps removed therefrom.
Figure 4:
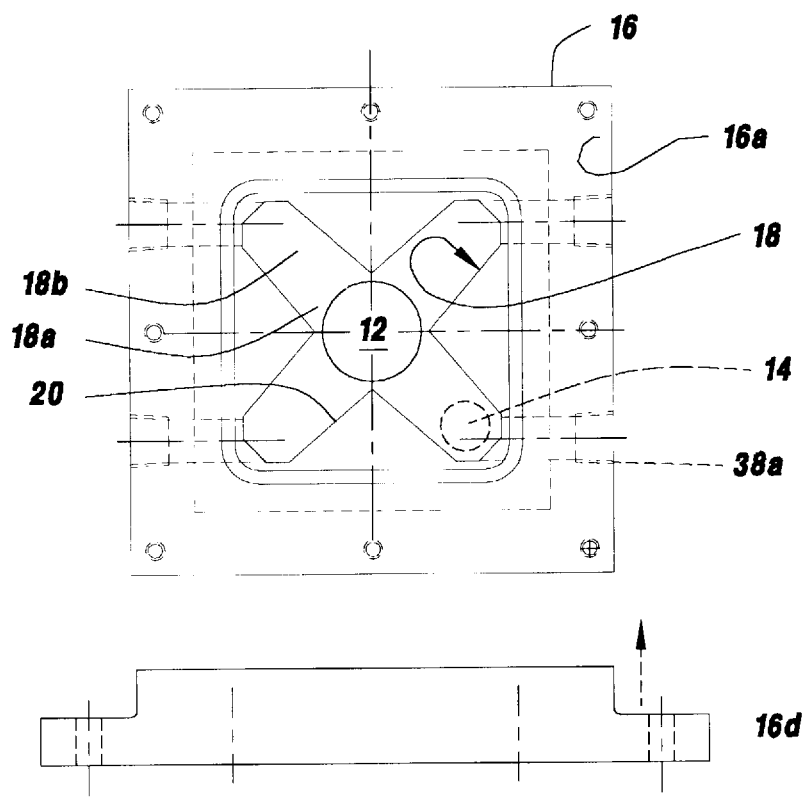
FIG. 4 is an end elevational view of the body illustrated in FIG. 3 and taken along line 4—4.

FIGS. 3 and 4 illustrates in more particularity the body 16 prior to assembly of additional components thereto. As shown in FIG. 4, the reflector 18 is symmetrical about the longitudinal or axial centerline axis of the body 16. It includes a center cavity 18a for coaxially receiving the laser rod 12, and a plurality of lateral cavities 18b disposed parallel to and extending radially outwardly from the center cavity 18a for receiving the flashlamps 14 for optically pumping the laser rod 12 to produce the laser beam therefrom.

The preferred sectional configuration of the reflector 18 is illustrated in more particularity in FIG. 4. Each of the reflector lateral cavities 18b are generally U-shaped in section for receiving respective ones of the lamps 14, one of which is illustrated in phantom. The U-section has a closed end in which the lamp 14 is positioned, and an open end that adjoins the center cavity 18a, which is generally circular. The walls of each lateral cavity 18b diverge radially inwardly toward the center cavity 18a, and the rod 12 therein, at suitable angles for obtaining good optical pumping efficiency of the rod 12. The lateral cavities 18b, and therefore the lamps 14 disposed therein, are positioned as closely as possible to the center cavity 18a and rod 12 therein for obtaining relatively close-coupling of the lamps 14 with the rod 12 for maximizing performance efficiency.

Although two diametrically opposite lateral cavities 18b and corresponding lamps 14 could be used as a minimum, in the preferred embodiment illustrated, the reflector 18 includes four equiangularly spaced apart, i.e. 90°, ones of the lateral cavities 18b arranged in a cross or X-configuration for corresponding receiving four of the flashlamps 14 to pump the rod 12. In order to obtain a compact design with low part count, the reflector body 16 itself is provided as the main supporting structural element of the head for rigidly mounting both the rod 12 and lamps 14. Conventional wire EDM machining makes possible the formation of the intricately shaped X-reflector 18 with the diametrically opposite lateral cavities 18b closely coupling the lamps 14 with the rod 12 disposed at the center of the reflector 18. The duct-like reflector 18 is effective for guiding light from the lamps 14 to the rod 12 in close optical coupling.

In the preferred embodiment of the invention illustrated in FIG. 4, the surface of the reflector 18 is suitably polished and includes gold plating 20 over its entire surface for facing both the rod 12 and the lamps 14 for imaging light from the lamps into the rod. The purpose of this surface treatment is to image as much of the useful pump light as possible from the lamps into the laser rod, but keep blue and ultraviolet light away from the rod. An Nd:glass laser rod 12 has its most useful pump-absorption near 800 microns wavelength, whereas the pump bands in the green and blue regions of the lamp spectrum have a high quantum defect and hence contribute more to heat deposition in the glass rod than to the creation of optical inversions. Since gold is an excellent reflector for wavelengths longer than 600 microns, but has low reflectivity below 500 microns, it is ideally suited to filter out the unwanted wavelengths. In addition, gold is chemically stable and can keep a shiny surface almost indefinitely if properly protected by not being exposed to stagnant or unfiltered water for extended periods of time.

Figure 5:
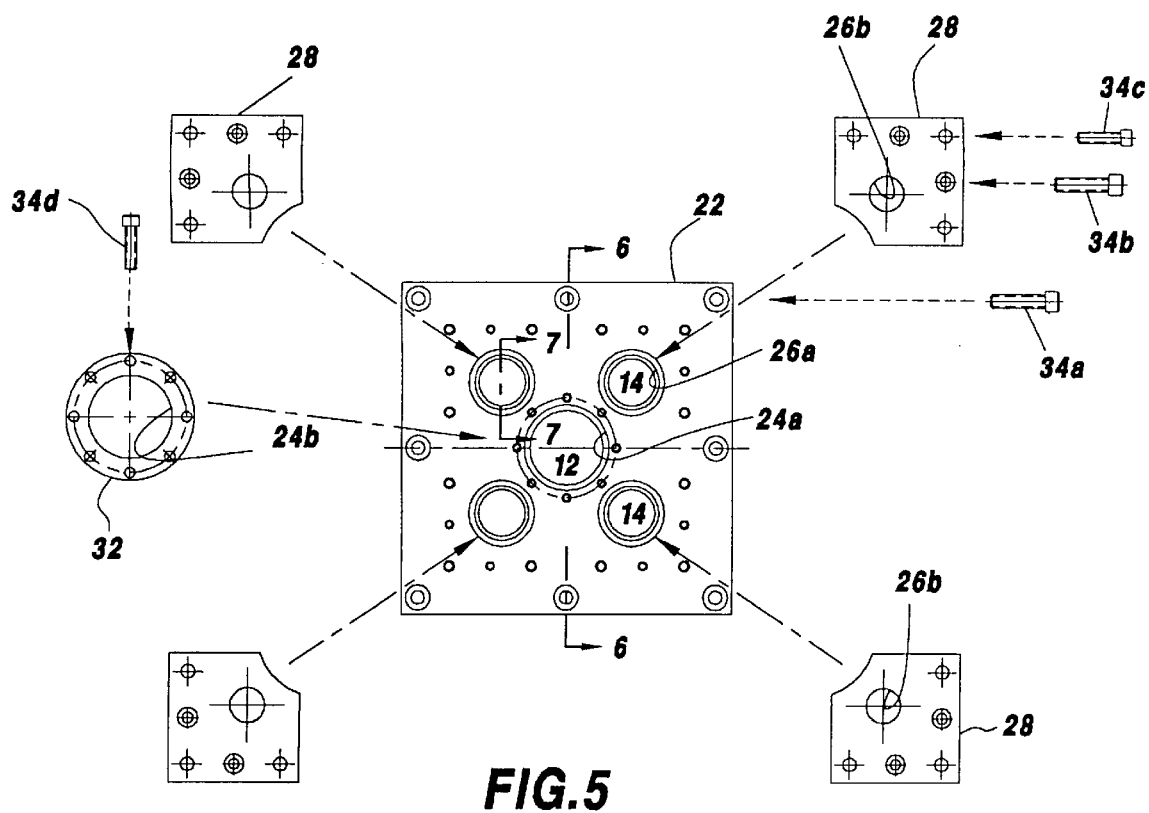
FIG. 5 is an elevational, exploded view of a reflector endcap which closes the opposite ends of the body illustrated in FIG. 1, and supports lamp inner and outer endcaps and a rod retainer.
Figure 5:
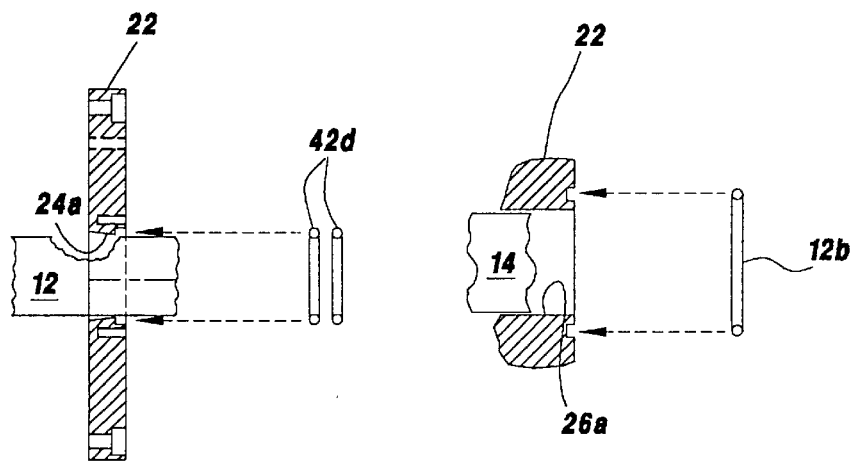

In order to removably mount the individual lamps 14 and rod 12 and provide suitable sealing of the body 16, the head 10 further includes a pair of reflector endcaps 22, shown assembled to the body in FIGS. 1 and 2, and shown in exploded view in FIG. 5. The endcaps 22 are preferably identical to each other and are removably mounted to the body first and second ends 16a,b to close the reflector 18 at opposite axial ends thereof. Each reflector endcap 22 as shown in FIG. 5 includes a central first rod port 24a for receiving a corresponding end of the rod 12, and a plurality of first lamp ports 26a for receiving respective ends of the lamps 14. FIGS. 6 and 7 illustrate in more particularity the respective first rod and lamp ports.

Illustrated also in FIG. 5 are a plurality of lamp inner endcaps 28, with four being used per reflector endcap 22 for mounting the four lamps 14. The inner endcaps 28 are removably mounted to each of the reflector endcaps 22, and each includes a second lamp port 26b which is coaxially aligned with respective ones of the first lamp ports 26a for receiving respective ends of the lamps 14.

A plurality of lamp outer endcaps 30 are illustrated in FIGS. 8 and 9 and are removably mounted to respective ones of the inner endcaps 28, preferably coextensively therewith. Each outer endcap 30 includes a third lamp port 26c coaxially aligned with respective ones of the first and second lamp ports 26a,b to define a sequential aperture for mounting and retaining respective ends of the lamps 14 to the body 16.

Illustrated in FIGS. 5 and 10 is an annular rod retainer 32 which has a center second rod port 24b through which a respective end of the rod 12 extends. The retainer 32 is removably mounted to a respective reflector endcap 22, with the first and second rod ports 24a,b being coaxially aligned for accurately radially positioning the rod 12 in the body 16.

During assembly, each of the two reflector endcaps 22 is fastened around its perimeter to the corresponding body first and second ends 16a,b by a suitable plurality of first screws 34a as shown in FIGS. 1, 2, and 5. Each of the eight lamp inner endcaps 28 is next suitably fastened to its respective position on respective ones of the reflector endcaps 22 using a suitable plurality of second screws 34b as shown in FIGS. 1, 2, and 5. The individual, cylindrical flashlamps 14 may then be inserted through the respective first and second cylindrical lamp ports 26a,b and completely through the reflector 18. The cylindrical laser rod 12 may be similarly inserted through the first rod ports 24a in the center of the reflector endcaps 22. The eight lamp outer endcaps 30 shown in FIGS. 8 and 9 may then be assembled atop the respective lamp inner endcaps 28 and suitably fastened thereto by a suitable plurality of third screws 34c, with all three screws 34a,b,c preferably extending to and threadingly engaging the respective body first and second ends 16a,b. The rod retainers 32 illustrated in FIG. 5 are then fastened to the respective reflector endcaps 22 by a suitable plurality of fourth screws 34d as shown assembled in FIG. 10. The order of assembly may be varied as desired.

In this way the cooperating lamp inner and outer endcaps 28, 30 and rod retainers 32 allow each of the lamps 14 and rod 12 to be independently removed and replaced as desired during a maintenance outage without requiring disassembly of any other components. The opposite ends of the individual lamps 14 as illustrated in FIG. 1 are accessible at the third lamp ports 26c for allowing them to be conventionally electrically connected to a suitable power supply for powering the lamps 14 during operation. The opposite ends of the rod 12 are unobstructed by the respective rod retainers 32 for allowing operation of the laser rod 12 itself for developing a suitable laser beam.

Since the laser head 10 develops heat during operation, means are provided for channeling a suitable filtered coolant 36, such as water, as illustrated schematically in FIGS. 1 and 2 through the reflector 18 for cooling both the lamps 14 and the rod 12. In the exemplary embodiment illustrated in FIGS. 1 and 2, the coolant channeling means include a plurality of inlets 38a in the form of holes extending into the body first end 16a for channeling the coolant 36 into the reflector cavities 18a,b. A plurality of fluid outlets 38b as shown in FIG. 1 are provided in the body second end 16b for discharging the coolant from the reflector cavities 18a,b.

In the exemplary embodiment illustrated in FIGS. 1 and 2, four coolant inlets 38a are provided at the four corners of the body first end 16a, and four coolant outlets 38b are provided at the four corners of the body second end 16b.

Each of the inlets and outlets 38a,b preferably includes a suitable fitting 40, one of which is shown in FIG. 2, which may take the form of a conventional Swagelok full flow quick-connect fitting to which suitable fluid conduits are connected for providing cool and suitably filtered coolant 36 into the body 16, and discharging heated coolant therefrom.

Since relatively large glass rods 12 can handle only moderate amounts of optical pumping power, the cooling of the laser head 10 is not critical and can be achieved with a simple flooded reflector cavity shared between the rod 12 and lamps 14. For reasons of efficiency and simplicity, the preferred embodiment does not include separate flow tubes surrounding each of the lamps 14. Although flow tubes may be used around the lamps 14, they are undesirable since they would severely reduce the opening angle of the reflector lateral cavities 18b and decrease optical pumping efficiency. Flow tubes would also significantly increase the complexity and the number of parts required for the laser head.

One object of the present invention is to provide relatively high optical pumping efficiency while maintaining relatively low thermal load on the rod 12. This is accomplished by closely coupling the individual lamps 14 adjacent to the rod 12, without flow tubes around the lamps 14. Omitting the flow tubes also allows the lamps 14 to be placed closer to the rod 12 for increasing pumping efficiency. This arrangement also reduces the number of water seals required, which again reduces complexity and parts count.

More specifically, the center and lateral reflector cavities 18a,b are preferably in direct flow communication with each other for channeling the coolant 36 to simultaneously cool both the lamps 14 and the rod 12. Means are provided for sealing the ends of the rod 12 and lamps 14 from leaking the coolant from the body 16. The sealing means preferably individually seal each of the lamps 14 and rod 12 for allowing individual removal and replacement thereof without disassembly of the other components.

As shown in FIG. 3, the sealing means preferably include a first O-ring 42a disposed in a complementary slot in each of the outboard faces of the body first and second ends 16a,b so that a corresponding flat inboard face of each of the reflector endcaps 22 may abut the O-ring and effect a seal thereat. Similarly, a second O-ring 42b as illustrated in FIG. 7 is disposed in a corresponding slot in the outboard face of the reflector endcaps 22 so that the flat inboard face of respective ones of the lamp inner endcaps 28 may abut the O-ring and effect a seal thereat as shown in FIG. 8. As shown in FIG. 9, a third O-ring 42c is disposed in a corresponding slot in the inboard face of each of the lamp outer endcaps 30 for abutting the flat outboard face of the inner endcaps 28 to effect a seal thereat. In this way, the first, second, and third O-rings 42a,b,c effectively seal the coolant 36 inside the reflector 18 from leaking past the respective ends of the four lamps 14.

As illustrated in FIG. 6, a pair of fourth O-rings 42d are disposed in a corresponding slot in the outboard face of each of the reflector endcaps 22 and tightly surround the respective ends of the rod 12 for effecting a seal thereat upon engagement of the flat inboard face of the rod retainers 32 against the O-rings. And, as indicated above with respect to FIG. 1, if the center joint 16c is provided, a fifth O-ring 42e may be disposed in a corresponding slot formed in one of the central end faces thereof for providing a suitable seal thereat.

The several O-rings provide effective fluid-tight sealing for containing the coolant 36 inside the reflector cavities 18a,b. The individual lamps 14 may be positioned radially as close as possible to the rod 12 limited only by the dimensions of the adjoining rod retainer 32 with the complementary inner and outer endcaps 28,30.

The diameter of each lamp 14 is preferably as small as possible, but is usually limited by a restriction on the current density in the lamp, which is typically about 1 kA/cm$^2$. The optical pump power in the laser head 10 preferably does not exceed 2 kW, and therefore, the average heating power can be carried away with cooling water at a flowrate of less than about 3 liters per minute, with an allowable temperature difference between the inlets and outlets of about 10° C.

The resulting laser head 10 described above is relatively simple, compact, and has relatively few parts count. The unitary body 16 provides both a structural element for accurately supporting the lamps 14 relative to the laser rod 12, as well as intricately defining the reflector 18 formed therein. The reflector endcaps 22, and lamp inner and outer endcaps 28, 30 allow each of the individual lamps 14 to be separately installed and removed as desired without requiring disassembly of the other lamps or rod which simplifies maintenance. The laser rod 12 itself is also independently replaceable by removing the retainers 32. Relatively large laser rods 12 may therefore be effectively mounted, cooled, sealed, and optically pumped in a relatively simple structure with good optical pumping efficiency.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A laser head comprising:
    a body having first and second opposite axial ends, and a bore extending axially between for defining a reflector;
    said body being a unitary member circumferentially around said reflector;
    said reflector including a center cavity for coaxially receiving a laser rod, and a plurality of lateral cavities disposed parallel to and extending radially outwardly from said center cavity for receiving lamps for optically pumping said laser rod to produce a laser beam therefrom, wherein the center cavity, adjacent to the laser rod, is in direct flow communication within the reflector, with the plurality of lateral cavities; and
    a pair of first endcaps for fluidly sealing the reflector.

2. A head according to claim 1 wherein the pair of first endcaps have an inner reflecting surface and are removably mounted to said body first and second ends to fluidly seal said reflector, and each including a rod port for receiving an end of said rod, and a plurality of first lamp ports for receiving respective ends of said lamps.

3. A head according to claim 1 wherein said reflector lateral cavities are generally U-shaped for receiving said lamps adjacent to a closed end thereof, with an open end thereof adjoining said center cavity for optically coupling said lamps to said rod.

4. A head according to claim 3 wherein said reflector includes four equiangularly spaced apart ones of said lateral cavities arranged in a X-configuration for correspondingly receiving four of said lamps to pump said rod.

5. A head according to claim 3 wherein said reflector includes a gold plating for facing both said rod and lamps for imaging light from said lamps into said rod.

6. The laser head of claim 1, further comprising means for channeling coolant to an interior but not an exterior of the body, wherein the body comprises a metal.

7. A laser head comprising:

a body having first and second opposite axial ends, and a bore extending axially therebetween for defining a reflector;

said body being a unitary member circumferentially around said reflector;

said reflector including a center cavity for coaxially receiving a laser rod, and a plurality of lateral cavities disposed parallel to and extending radially outwardly from said center cavity for receiving lamps for optically pumping said laser rod to produce a laser beam therefrom;

a pair of first endcaps for fluidly sealing the reflector, wherein the pair of first endcaps have an inner reflecting surface and are removably mounted to said body first and second ends to fluidly seal said reflector, and each including a rod port for receiving an end of said rod, and a plurality of first lamp ports for receiving respective ends of said lamps; and a plurality of lamp inner endcaps removably mounted to each of said first endcaps, and each of said plurality of lamp inner endcaps including a second lamp port coaxially aligned with said first lamp port for receiving respective ends of said lamps.

8. A head according to claim 7 further comprising a plurality of lamp outer endcaps removably mounted to respective ones of said inner endcaps, and each of said plurality of lamp outer endcaps including a third lamp port coaxially aligned with said first and second lamp ports for mounting respective ends of said lamps to said body.

9. A head according to claim 7 further comprising means for channeling a coolant through said reflector for cooling both said rod and lamps.

10. A head according to claim 9 further comprising means for sealing said ends of said rod and lamps from leaking said coolant from said body.

11. A head according to claim 10 wherein said sealing means individually seal each of said lamps and rod for allowing individual removal and replacement thereof.

12. A head according to claim 10 further comprising said rod and lamps mounted in said body.

13. A head according to claim 12 wherein said center and lateral cavities of said reflector are in flow communication with each other for channeling said coolant to simultaneously cool both said rod and lamps.

14. A head according to claim 12 further comprising a pair of rod retainers removably mounted to said first endcaps for retaining said rod at both ends.

15. A laser apparatus comprising:

a body having a bore extending through the body;

a laser rod disposed in the bore;

a plurality of lamps disposed in the bore;

first means for individually forming a water-tight seal between the laser rod and the bore; and second means for individually forming respective water-tight seals between the lamps and the bore;

wherein said first means comprises:
    a reflector endcap sealed to the body; and
    a rod retainer element sealed to the reflector endcap;
    and wherein said second means comprises:
        an inner endcap sealed to the reflector endcap; and
        an outer endcap sealed to the inner endcap.

16. A laser apparatus comprising:

a unitary body having a bore extending through the body, the bore defining a reflector, the bore including a center cavity and a plurality of lateral cavities;

a laser rod disposed in the center cavity of the bore;

a plurality of lamps disposed in the plurality of lateral cavities of the bore;

first means for individually forming a water-tight seal between the laser rod and the bore; and second means for individually forming respective water-tight seals between the lamps and the bore;

wherein the first means and the second means allow individual replacement of the laser rod and the lamps, respectively, and the center cavity, adjacent to the laser rod, is in direct flow communication within the reflector, with the plurality of lateral cavities.

17. The laser apparatus of claim 16, wherein the lateral cavities each extend outwardly from the central cavity.

18. The laser apparatus of claim 16, further comprising means for channeling a coolant through the bore for cooling both the laser rod and the plurality of lamps.

19. The laser apparatus of claim 16, wherein the plurality of lateral cavities are in fluid communication with the central cavity.

20. The laser apparatus of claim 16, wherein the body is a supporting structural element of the laser apparatus for supporting the laser rod and the plurality of lamps.

21. The laser apparatus of claim 16, further comprising means for flowing coolant to an interior but not an exterior of the body, wherein the body comprises a metal.

22. The laser apparatus of claim 16, wherein the bore has a gold-plated surface which images light from the plurality of lamps into the laser rod.

* * * * *